United States Patent [19]
Gettys et al.

[11] Patent Number: 5,653,829
[45] Date of Patent: Aug. 5, 1997

[54] TIRE WITH THREE BELT PLIES

[75] Inventors: Terry Keith Gettys, Greenville; Richard Thomas Janczak, Greer; Robert Vanstory Teeple, Fountain Inn, all of S.C.

[73] Assignee: Michelin Recherche et Technique S.A., Granges-Paccot, Switzerland

[21] Appl. No.: 453,550

[22] Filed: May 30, 1995

Related U.S. Application Data

[63] Continuation of Ser. No. 231,958, Apr. 21, 1994, abandoned, which is a continuation of Ser. No. 880,376, May 8, 1992.

[51] Int. Cl.$^6$ .................... B60C 9/18; B60C 9/20
[52] U.S. Cl. .................... 152/534; 152/526; 152/527; 152/536
[58] Field of Search ............... 152/526–527, 152/534–536

[56] References Cited

U.S. PATENT DOCUMENTS

| | | | |
|---|---|---|---|
| 2,493,614 | 1/1950 | Bourdon | 152/534 |
| 3,675,703 | 7/1972 | Watts et al. | 152/527 |
| 3,945,422 | 3/1976 | Pottinger | 152/536 X |
| 4,526,217 | 7/1985 | Maeda et al. | 152/527 |
| 4,696,335 | 9/1987 | Tsukagoshi et al. | 152/535 |
| 5,061,557 | 10/1991 | Kot et al. | 57/213 X |
| 5,131,446 | 7/1992 | Fukumoto et al. | 152/526 X |

FOREIGN PATENT DOCUMENTS

| | | |
|---|---|---|
| 234003 | 11/1985 | Japan . |
| 3-96402 | 4/1991 | Japan . |

OTHER PUBLICATIONS

*Mechanics of Pneumatic Tires*, ed. Samuel Clark US Dept. of Transportation, Aug. 1981, p. 131.

Primary Examiner—Adrienne C. Johnstone
Attorney, Agent, or Firm—Robert R. Reed; Russell W. Warnock

[57] ABSTRACT

The radial pneumatic tire of this invention is suitable for use on passenger cars, light trucks, or the like. The belt package of this otherwise conventional tire has three belts which are preferably steel. The first belt is at an angle of 55 to 80 degrees, the second belt is at an angle of 18 to 28 degrees and the third belt is at an angle or −18 to −28 degrees with respect to the midcircumferential plane. The parallel reinforcing members of the first belt ply are spaced apart a distance at least equal to the parallel reinforcing members of the second belt ply. The parallel reinforcing members of the third belt ply are spaced a distance apart a distance less than those of the second belt ply. The strength per unit width in the circumferential direction of the first belt ply is less than the strength per unit width in the circumferential direction of the second belt ply. The strength per unit width of the third belt ply is greater than that for the second belt ply. The preferred embodiment tire has the sum of the first and second belt ply strengths being at least equal to the third belt ply strength. An alternate embodiment tire has the sum of the first and second belt ply strengths being at most equal to the third belt ply strength.

2 Claims, 4 Drawing Sheets

TIRE WITH THREE BELT PLIES

This is a continuation of application Ser. No. 08/231,958 filed on Apr. 21, 1994, now abandoned, which is a continuation of Ser. No. 07/880,376 filed on May 8, 1992.

BACKGROUND OF THE INVENTION

1. Technical Field

The present invention relates generally to a pneumatic radial tire suitable for use on a passenger car, light truck, or the like. In particular, the present invention relates to an improved belt package structure of the tire.

2. Description of the Prior Art

It is known that the automotive industry continually seeks to improve vehicle fuel economy. In fact, many national governments throughout the world either have or are proposing mandated minimum fuel economy standards. In the United States of America, for example, minimum standards for corporate average fuel economy are constantly increasing. Thus, the automotive manufacturers must respond and seek ways to improve the minimum average fuel economy for the entire line of cars sold during a single model year.

To improve vehicle fuel economy, the automobile manufacturers work with tire manufacturers to decrease the rolling resistance and the overall weight of a tire used on a vehicle. Rolling resistance is defined herein as the amount of energy loss attributable only to the tire as the tire deforms at a contact patch during rotation. The tangential force exerted on the tire at the contact patch to make it roll divided by the load carried by the tire is the rolling resistance coefficient. The greater the energy loss the more the rolling resistance and the greater the work required for rotating the tire independent of moving the vehicle. This relatively greater work is required because of the various materials used in the tire and their properties at operating temperatures such as stress-strain magnitude and hysteresis.

One way that automobile manufacturers improved rolling resistance was to adopt the use of radial pneumatic tires in place of bias tires on their vehicles. It is known that the use of radial tires on a vehicle in place of bias tires leads to improvements in fuel economy. The tire 1 of FIG. 1 is typical of the known radial tires conforming to the 1992 Tire and Rim Association (T&RA) standards, herein called the "industry standards". A typical radial tire includes a pair of spaced apart and circumferentially inextensible beads. A carcass ply 7 having reinforcing members disposed in a generally radial direction extends between the beads and is attached at its axially opposite end portions to a respective one of the beads. The tire also includes a tread portion 2 and a pair of sidewall portions. The tread portion 2 is located in a crown region of the tire 1. A belt package 8 is disposed between the carcass ply 7 and tread portion 2. The belt package 8 of this prior art design includes two belt plies 4 and 5. The belt plies 4,5 each have equal spaced reinforcing members disposed at equal angles but in opposite directions with respect to the midcircumferential plane R. The tire 1 rotates about its axis of rotation A and has a midcircumferential plane R perpendicular to the axis of rotation A. A two-belt passenger tire 1 conforming to industry standards has a first crown thickness D1. The first crown thickness D1 comprises the thickness of the carcass ply 7, the thickness B1 of the two-belt package 8, the thickness S1 of the subtread 3 and the depth G1 of the groove of the tread 2.

The radial pneumatic tire 1 can be further designed to have construction features that reduce its rolling resistance. The crown area of the tire, comprising the tread and belt package, can be designed to limit deformation due to forces (stress vs. strain) that produce energy losses from rolling contact with the road surfaces. Rolling resistance is directly proportional to this energy loss. Deformations of the tire crown area are reduced by providing a belt package which has a higher rigidity of stiffness. Such a belt package will maintain its shape better when subjected to the same external forces. High inflation pressure in the tire also has a stiffening influence on the tire and is known to improve rolling resistance, but to the detriment of ride comfort and wear.

Ways of decreasing rolling resistance of a tire are often approached from optimizing the footprint or contact patch of the tire. Such improvements are intended to approach a theoretically ideal shape for the footprint or contact patch. It is generally felt that improvements to the footprint, or contact patch of the tire, can be achieved by stiffening the belt package of the tire. This may be accomplished by adding a third belt to the belt package. However, these improvements may adversely affect the mass of the tire and/or the ride comfort of the vehicle as well as the tread life of the tire.

Ways of stiffening the belt package in a tire are disclosed in U.S. Pat. Nos. 2,493,614, 3,945,422 and 4,526,217. The U.S. Pat. No. 2,493,614 discloses a tire with three belts. The first and second belts located closest to the carcass each have reinforcing members extending at an angle of 17 to 28 degrees with respect to a midcircumferential plane but in opposite directions. The third belt radially outward of the first and second belts has reinforcing members extending at an angle in the range of 45 to 90 degrees with respect to the midcircumferential plane. The reinforcing members in the belts form a series of triangles which produce a desired rigidity of the belt package. The order of superposition of the belts may be selected as desired to vary rigidity of the belt package by triangulation. Ride comfort, wear and endurance of the belt package are not optimized in a tire as disclosed in this patent.

The U.S. Pat. No. 3,945,422 discloses a radial pneumatic tire in which the belt package includes three annular belts. Each of the annular belts includes a plurality of parallel extending steel alloy reinforcing members. The radially innermost first belt has the reinforcing members disposed at an angle of 24 degrees relative to the midcircumferential plane of the tire and a width of 6 inches. The number of reinforcing members is 9 reinforcing members per inch taken in a direction perpendicular to the extent of the reinforcing members. A second belt disposed radially outward from the first belt has reinforcing members disposed at an angle of 29 degrees relative to the midcircumferential plane but opposite to the direction of the reinforcing members in the first belt. The second belt has a width of 4.8 inches and the number of reinforcing members is 18 per inch taken in a direction perpendicular to the extent of the reinforcing members. A third belt disposed radially outward of the second belt has reinforcing members disposed at an angle of 29 degrees relative to the midcircumferential plane in the same direction as the reinforcing members in the first belt. The third belt has a width of 5.4 inches and the number of reinforcing members is 9 per inch taken in a direction perpendicular to the extent of the reinforcing members. The relative width of the belts is wide, narrow and intermediate when progressing radially outward. All three belts have a different width and belt reinforcing members are at most 29 degrees relative to the midcircumferential plane.

The U.S. Pat. No. 4,526,217 discloses a tire having a belt package with three annular belts. Each of the belts include a plurality of parallel extending metal cords, such as steel. This three ply belt package also provides improved stiffening of the belt package of the tire. The angle of the reinforcing members in the first belt is between 25 degrees to 50 degrees relative to the midcircumferential plane of the tire. In comparison, the second and third belt reinforcing members extend at an angle of 10 to 30 degrees relative to the midcircumferential plane. The reinforcing members in the first belt and the second belt extend in the same direction relative to the midcircumferential plane of the tire. The direction the reinforcing members in the third belt extend is opposite to the direction reinforcing members in the first and second plies extend. The intended use of this tire is for heavy duty applications. However, the rigidity of the belt package is disclosed in this patent as a desirable feature for running on good roads at relatively high speed as well as on bad roads and non-paved roads of construction sites.

SUMMARY OF THE INVENTION

In order to decrease the rolling resistance of a tire and to improve the traction and the wear of its tread, without increasing the mass, the present invention is directed to a tire having an improved triangulated belt package.

A radial tire embodying the present invention includes a pair of axially spaced apart beads. A radial carcass ply extends between the beads. Axially opposite end portions of the carcass ply are secured to a respective bead. A tread portion is located radially outward of the carcass ply for engagement with a ground surface. A belt package is located between the carcass ply and the tread portion. The belt package comprises the following belts. A first belt is located radially outward of the carcass ply. The first belt has a plurality of parallel extending reinforcing members of a steel alloy. Reinforcing members in the first belt are spaced apart a substantially equal first distance. Each reinforcing member in the first belt is disposed at an first angle in the range of 55 to 80 degrees relative to a midcircumferential plane of the tire. A second belt is located radially outward of the first belt. The second belt also has a plurality of parallel extending reinforcing members of a steel alloy. Reinforcing members in the second belt are spaced apart a substantially equal second distance being at most equal to the first distance. Each reinforcing member in the second belt is disposed at a second angle in the range of 18 to 28 degrees relative to the midcircumferential plane of the tire. A third belt is located radially outward of the second belt. The third belt also has a plurality of extending reinforcing members of a steel alloy. Reinforcing members in the third belt are spaced apart a substantially equal third distance which is less than either the first or the second distances. Each reinforcing member in the third belt is disposed at an angle in the range of 18 to 28 degrees relative to the midcircumferential plane of the tire. The reinforcing members in the third belt extend in a direction relative to the midcircumferential plane of the tire opposite to the direction the second belt reinforcing members extend. The first and second distances may be in a range of 1.0 to 2.9 millimeters. The third distance may be in a range of 0.6 to 1.8 millimeters. Spacing of the reinforcing members depends upon a predetermined tensile strength of each member, the strength per unit width of each belt in the circumferential direction and the angle of each reinforcing member with respect to the midcircumferential plane.

The first belt of the tire of the present invention has a first strength per unit width in a direction parallel to the midcircumferential plane. The second belt has a second strength per unit width in a direction parallel to the midcircumferential plane. The second strength is greater than the first strength. The third belt has a third strength per unit width in a direction parallel to the midcircumferential plane. The third strength is greater than the second strength and the sum of the first and second strengths are preferably greater than the third strength. Alternatively the sum of the first and second strengths are approximately equal to the third strength.

The first belt may have a first width taken in a direction perpendicular to the midcircumferential plane in a range of 100 percent to 105 percent of the tread width of the tire. A second width of the second belt taken in a direction perpendicular to the midcircumferential plane is approximately equal to the first width. The third belt may have a third width taken in a direction perpendicular to the midcircumferential plane in a range of about 4 to 20 millimeters less than the second width. Each belt is symmetrical relative to the midcircumferential plane of the tire.

A crown thickness of the tire of the present invention is defined as the dimension taken in a radial direction including the carcass ply, the belt package and the tread portion (including the subtread). This crown thickness may be in a range of about 92 percent to 96 percent of a crown thickness for a two-belt passenger tire conforming to T&RA industry standards (FIG. 1). The overall mass of the tire having three belts of the present invention is approximately equal to the overall mass of the two-belt tire.

According to another embodiment of the present invention, the radial tire comprises a pair of axially spaced apart beads with a radial carcass ply extending between the beads. Axially opposite end portions of the carcass ply are secured to a respective bead. A tread portion is located radially outward of the carcass ply for engagement with a ground surface. A belt package is located between the carcass ply and the tread portion. The belt package comprises the following belts. A first belt is located radially outward of the carcass ply and has a plurality of parallel extending reinforcing members. The first belt has a first strength per unit width in a circumferential direction. Each first belt reinforcing member is disposed at a first angle relative to the midcircumferential plane of the tire. The first angle may be in a range of 55 degrees to 80 degrees. A second belt is located radially outward of the first belt and has a plurality of parallel extending reinforcing members. The second belt has a second strength per unit width in the circumferential direction being greater than the first strength. Each second belt reinforcing member is disposed at a second angle relative to the midcircumferential plane of the tire. The second angle is in a range of 18 degrees to 28 degrees. A third belt located radially outward of the second belt and has a plurality of parallel extending reinforcing members. The third belt has a third strength per unit width in the circumferential direction which is greater than either the first or the second strengths. Each third belt reinforcing member is disposed at a third angle relative to the midcircumferential plane of the tire in a direction opposite to the direction of the second angle. The third angle is in a range of 18 degrees to 28 degrees.

According to a further embodiment of the present invention the radial tire comprises a pair of axially spaced apart beads with a radial carcass ply extending between the beads. Axially opposite end portions of the carcass ply are secured to a respective bead. A tread portion is located radially outward of the carcass ply for engagement with a ground surface. A belt package is located between the carcass ply and the tread portion. The belt package comprises the following belts. A first belt located radially outward of the carcass ply has a plurality of substantially parallel extending reinforcing members. The first belt reinforcing members are spaced apart a substantially equal first distance. The first belt has a first strength per unit width in a direction parallel to a midcircumferential plane of the tire. A second belt located radially outward of the first belt has a plurality of substantially parallel reinforcing members spaced apart a substantially equal second distance. The second distance is at most equal to the first distance. The second belt has a second strength per unit width in a direction parallel to the midcircumferential plane being greater than the first strength. A third belt located radially outward of the second belt has a plurality of substantially parallel extending reinforcing members spaced apart a substantially equal third distance. The third distance is less than either the first or the second distances. The third belt has a third strength per unit width in a direction parallel to the midcircumferential plane greater than either the first or the second strengths.

It has been found that the belt package of the tire embodying the present invention enables a more optimum footprint shape during rotation of the tire contact with a surfaces. An advantage of a tire embodying the present invention is that rolling resistance is reduced by 15 to 27 percent with approximately the same tire mass. Low speed wet traction improvements of 20 percent were found and a 17 percent reduction in medium severity wear was also achieved.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 2:
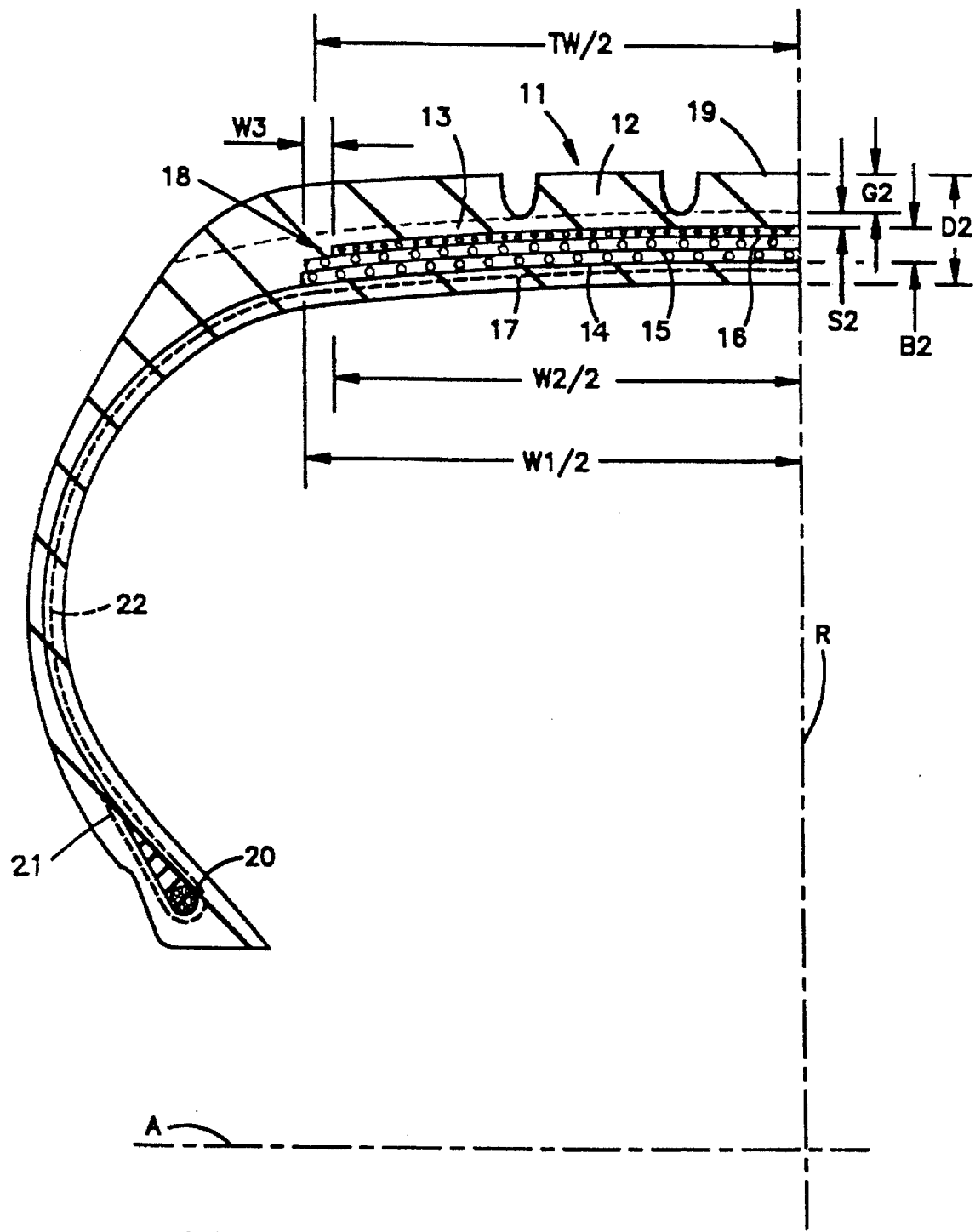
FIG. 2 is a sectional view of a symmetrical portion of a tire having a belt package embodying the present invention.

A neumatic tire 11 embodying the present invention is illustrated in FIG. 2. The tire 11 is particularly suitable for use as a radial all-weather tire on passenger cars, light trucks and the like. The tire 11 is rotable about an axis A. A midcircumferential plane R extends perpendicular to axis A. The tire 11 is symmetrical about the midcircumferential plane R. Only one half of the tire 11 is illustrated in FIG. 2, but it will be apparent that the other half of the tire is substantially identical in construction.

A radial carcass ply 17 extends between axially spaced apart beads 20. Each of the beads 20 is inextensible in the circumferential direction. The carcass ply 17 has axially opposite end portions 21 secured to a respective one of the beads 20. A tread portion 12 is located radially outward of the carcass ply 17 in a crown portion of the tire 11. The tread portion 12 includes a subtread 13 which is also made of a rubber material. During rotation of the tire 11 through the footprint, the outer circumferential surface 19 of the tread 12 engages the ground surface over a tread width TW. The tread width TW is that portion of the tread 12 in contact with the ground surface under Tire and Rim Association (T&RA) industry standard operating conditions of pressure and load.

The carcass ply 17 has at least one layer with reinforcing members 22 disposed at an angle with respect to midcircumferential plane R of the tire 11 approximately 70 to 90 degrees, preferably 90 degrees. There may be more than one carcass ply 17. A belt package 18 embodying the present invention is located between the carcass ply 17 and the tread portion 12. The belt package 18 includes three angular belt plies 14, 15 and 16.

The first belt 14 of the belt package 18 has a plurality of parallel reinforcing members 41 disposed at a first acute angle A1 (FIGS. 3 and 4A) relative to a line C1 which extends in a direction parallel to the midcircumferential plane R and tangent to the first belt 14. The first angle A1 is in a range of 55 degrees to 80 degrees, preferably equal to 65 degrees. The second belt 15 is located radially outward of the first belt 14. The second belt 15 has substantially parallel reinforcing members 42 disposed at a second acute angle A2 relative to a line C2 (FIGS. 3 and 4B) which extends in a direction parallel to the midcircumferential plane R and tangent to the second belt 15. The second angle A2 is in a range of 18 degrees to 28 degrees, preferably equal to 22 degrees. The first angle A1 of the preferred embodiment tire 11 is in the same direction relative to the midcircumferential plane R as the second angle A2. A third belt 18 is located radially outward of the second belt 15. The third belt 16 has substantially parallel reinforcing members 43 disposed at a third acute angle A3 relative to a line C3 (FIGS. 3 and 4C) which extends in a direction parallel to the midcircumferential plane R and tangent to the third belt 16. The third angle A3 is disposed in a direction opposite to the second angle A2 from the midcircumferential plane and is in a range of 18 degrees to 28 degrees, preferably equal to 22 degrees.

Figure 3:
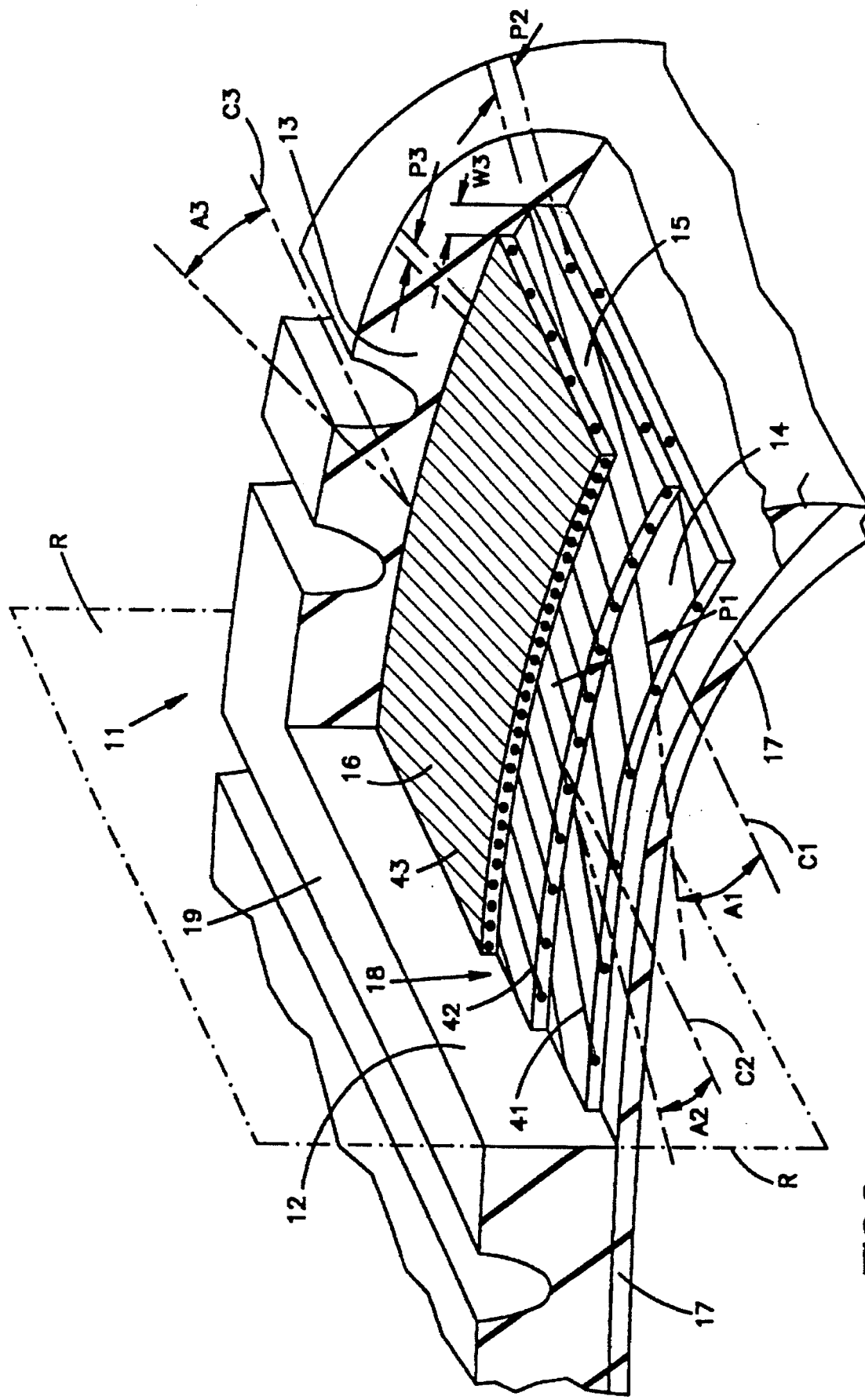
FIG. 3 is a partial perspective view of a crown portion of the tire illustrated in FIG. 2 having parts removed for clarity.

The relative spacing of the reinforcing members 41, 42 and 43 in each belt ply 14, 15 and 16 is illustrated in FIGS. 3 and 4. The first belt 14 has its reinforcing members 41 spaced apart a substantially equal first distance P1. The second belt 15 has its reinforcing members 42 spaced apart a substantially equal second distance P2. The first distance P1 is at least equal to the second distance P2. The third belt 16 has its reinforcing members 43 spaced apart a substantially equal third distance P3. The third distance P3 is less than either the second distance P2 or the first distance P1.

The predetermined spacing P1, P2, P3 between respective belt reinforcing members 41, 42, 43 in combination with the angles A1, A2 and A3 provides a resultant strength of the belt package 18 in the circumferential direction suitable for the intended use of the tire 11. Spacing distances P1, P2 or P3 are the center to center distance of reinforcing members 41, 42 or 43 in a respective belt 14, 15 or 16 perpendicular to the longitudinal extent of adjacent reinforcing members. The first distance P1 is in a range of 1.0 millimeter to 2.9 millimeters, preferably equal to 1.4 millimeters. The second distance P2 is also in a range of 1.0 millimeter to 2.9 millimeters, preferably equal to 1.1 millimeters. The third distance P3 is in a range of 0.8 millimeter to 1.8 millimeters, preferably equal to 0.8 millimeter. The distances P1, P2 and P3 are determined as a function of the type of reinforcing members used and their respective tensile strength. For the preferred embodiment of this invention, the tensile strength "t" of each of the reinforcing members 41, 42, 43 has substantially the same value in the first belt 14, the second belt 15 and the third belt 16 respectively. However, for one alternate embodiment, the tensile strength of reinforcing members 41 may be as much as 1.5 to 2.0, preferably 1.6, times the tensile strength of reinforcing members 42 or 43.

Figure 4C:
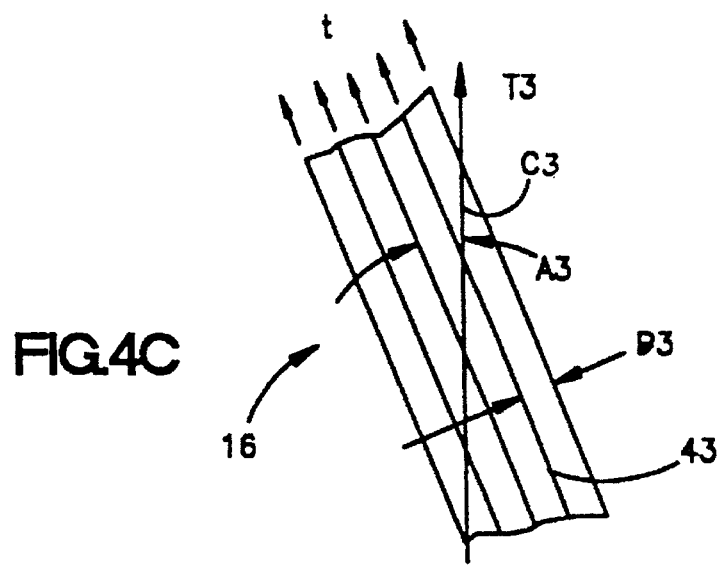
FIGS. 4A–4C are partial plan views of the respective belt plies of the belt package illustrating the orientation of reinforcing members in the belt plies.
Figure 4B:
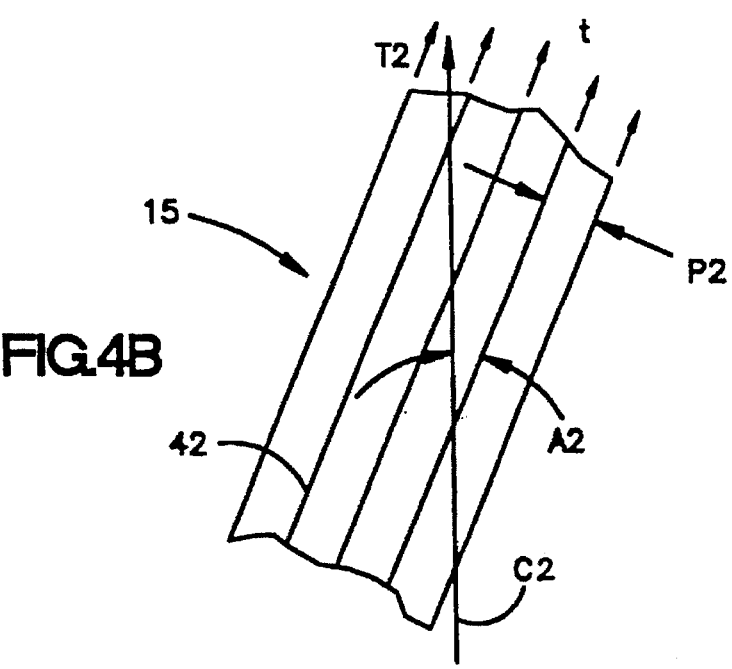
Figure 4A:
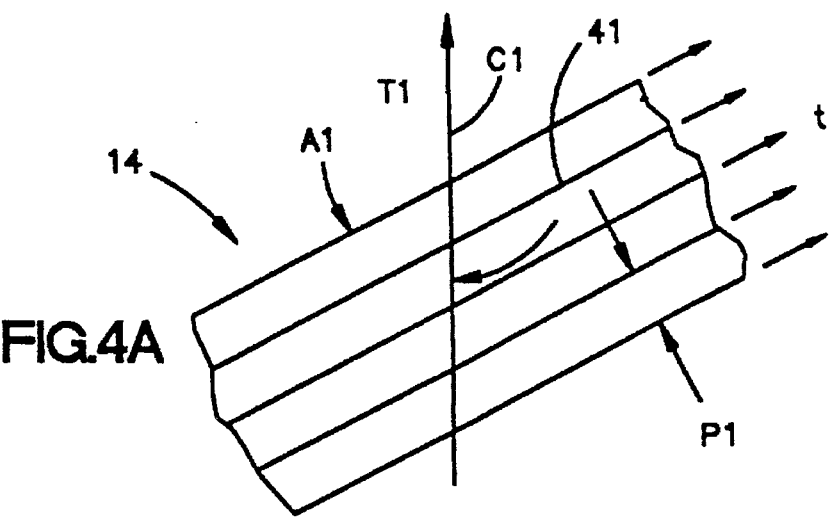

The strength per unit width T1, T2, T3 in the circumferential direction of the three belts 14, 15 and 16 is illustrated in FIGS. 4A, 4B and 4C respectively. The tensile strength t of each reinforcing member 41, 42, 43 is illustrated in each of these FIGS. 4A, 4B and 4C. This illustrates that the preferred embodiment tire 11 having the tensile strength t of each reinforcing member 41, 42, 43 equal in the longitudinal direct of the reinforcing member in the first belt 14, second belt 15, and third belt 16 respectively. The strength per unit width T1, T2, T3 in the circumferential direction of each respective belt 14, 15, 16 is directly proportional to the predetermined tensile strength t of a respective reinforcing member 41, 42, 43 and the square of the cosine of a respective angle A1, A2, A3 and inversely proportional to the respective spacing P1, P2, P3. Each belt ply reinforcing member 41, 42, 43 for the tire 11 has two wires helically twisted with each wire having a diameter in a range of 0.23 millimeters to 0.32 millimeters, preferably equal to 0.28 millimeters. The twist is in a range of 10 millimeters to 20 millimeters per revolution, preferably equal to 15 millimeters per revolution. The preferred material of the reinforcing members is a steel alloy of a high strength having a carbon content in the range of 0.820 percent to 0.830 percent carbon, preferably 0.825 percent carbon. Reinforcing members have a preferred tensile breaking load of 38 dan at 1.7 percent strain.

The first belt 14 has a first strength per unit width T1 (FIG. 4A) in a direction parallel to the midcircumferential plane R. It is observed that the strength per unit width T1 of the first belt 14 in the circumferential direction is a function of the tensile strength t of the reinforcing member, the first distance P1 and the first angle A1 relative to line C1. The second belt has a second strength per unit width T2 in a direction parallel to the midcircumferential plane R. The second strength per unit width T2 is a function of the tensile strength t of the reinforcing member, the second distance P2 and the second angle A2 relative to line C2. The second strength per unit width T2 in the circumferential direction is greater than the first strength per unit width T1 in the circumferential direction for this preferred embodiment tire 11. The third belt 16 has a third strength per unit width T3 (FIG. 4C) in a direction parallel to the midcircumferential plane R. The third strength per unit width T3 is a function of the tensile strength t, the third distance P3 and the third angle A3 relative to line C3. The third strength per unit width T3 in the circumferential direction is greater than the second strength per unit width T2 in the circumferential direction for this preferred embodiment tire 11. An additional strength per unit width relationship exists for the preferred embodiment tire 11. That is, the first strength per unit width T1 plus the second strength per unit width T2 is preferably greater than the third strength per unit width T3. However, at certain values of spacing P1, P2, P3 and angle A1, A2, A3 the third strength per unit width T3 can be approximately equal to the first strength per unit width T1 plus the second strength per unit width T2.

An important feature of this invention is the transition of carcass tension forces to the belt package which reduce interply and intraply stresses and strains. The preferred angle of carcass ply 17 reinforcing members 22 is 90 degrees from the midcircumferential plane R. The first belt reinforcing members 41 have a preferred angle A1 of 65 degrees from the midcircumferential plane R. A first angular change of 25 degrees (90−65) between reinforcing members in the carcass ply 17 and the first belt 14 provides a gradual transition of forces from the carcass ply 17 to the first belt 14. The preferred angle A2 of the second belt 15 reinforcing members 42 is 22 degrees from the midcircumferential plane R.

A second angular change of reinforcing members 41, 42 from the first belt 14 to the second belt 15 is 43 degrees (65−22), with the reinforcing members 42 in the second belt 15 extending in the same direction relative to the midcircumferential plane R as the reinforcing members 41 in the first belt 14 extend. The preferred angle A3 of the third belt 16 reinforcing members 43 is 22 degrees, opposite in direction from the midcircumferential plane R as reinforcing members 42 of the second belt 15. The third angular change of 44 degrees (22−(−22)) exists between reinforcing members 42 in the second belt 15 and reinforcing members 43 in the third belt 16. The second and third angular changes within the belt package 18 are approximately equal and the first angular change is relatively small. Therefore, the stiffness realized from belt triangulation and the gradual transition of forces helps reduce the total energy loss of the tire 11.

A belt package stiffness related structural feature is the width of the respective belts 14, 15, 16. The respective width of each belt in the tire 11 embodying the present invention is illustrated in FIG. 2. The first belt 14 has a width W1 in a range of 100 percent to 105 percent, preferably equal to 104 percent, of the tread width TW of the tread portion 12. The second belt 15 has a second width approximately equal to the first width W1. The third belt 16 has a third width W2 which is less than the first width W1. The third belt 16 has its end portion recessed a predetermined distance W3 from the end portion of the second belt 15. This predetermined distance W3 is in a range of 2 millimeters to 10 millimeters, preferably equal to 6 millimeters. Each belt 14, 15, and 16 is symmetrically positioned relative to the midcircumferential plane R of the tire 11.

Figure 1:
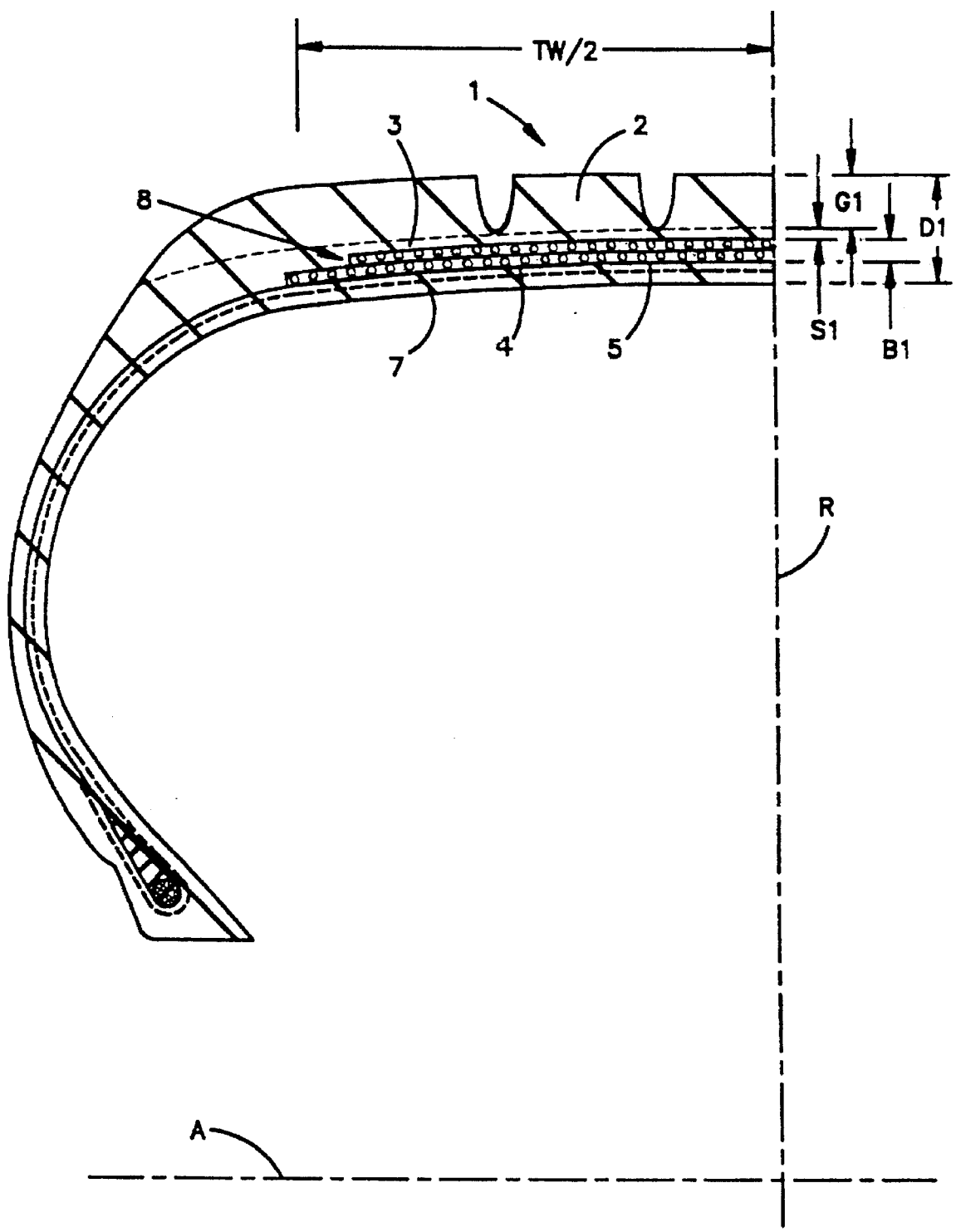
FIG. 1 is a sectional view of a symmetrical portion of a prior art tire.

The preferred embodiment tire 11 illustrated in FIG. 2 has a relatively uniform second crown thickness D2 over the tread width TW. Tread thickness D2 is defined as the thickness of the carcass ply 17, plus the subtread thickness S2, plus the thickness B2 of the belt package 18 and the groove depth G2 of the tread 12. The second crown thickness D2 is in a range of 92 percent to 96 percent, preferably equal to 92 percent, of the first crown thickness D1 of the industry standard tire 1 (FIG. 1). Although the second belt package 18 has a thickness B2 greater than the thickness B1 of the prior art two-belt package 8, the overall second crown thickness D2 is less than the first crown thickness D1. This is possible because groove depth G2 of tread 12 is much less than groove depth G1 of tread 2. Groove depth reductions are possible due to less wear for tire 11 and the increased number of smaller diameter belt package reinforcement members being more resistant to penetration and corrosion. This is realized without a reduction in the performance of the preferred embodiment tire 11 as discussed in the following subsection. The preferred thickness B2 of the belt package 18 is 1.95 millimeters. The belt package thickness B2 is constructed using small diameter reinforcing members 41, 42, 43 and a thin skim of a rubber material on each side to a respective belt 14, 15 and 16.

The resulting mass of tire 11 using steel reinforcing members is less than that of the prior art tire 1 having the same conformity to size and load capacity, as defined by the industry standards. Reduced mass is possible using smaller diameter belt reinforcing members and the reduced groove depth discussed above. This is an important factor in reducing the rolling resistance of the tire. A second important factor is the reduced pantographic or Poisson effect of the belt package at the ground contact area. This is the result of belt reinforcing members having respective angles that form a geometrical triangulation which is relatively rigid. The total influence of all design changes discussed above accumulate to give a 15 to 27 percent reduction in rolling resistance for tire 11 under nominal operating conditions of pressure and load. Significant traction and wear improvements are also achieved.

An alternate embodiment of the present invention is to use a reinforcing member 41 having four wires of a steel alloy material twisted together for the first belt 14. Each of the reinforcing members has a preferred diameter of 0.28 millimeter. Normal strength steel having a preferred carbon content of 0.70 percent and a preferred twist rate of 15 millimeters per revolution is utilized for this alternate embodiment. With these reinforcing members in the first belt 14, the preferred tensile strength of reinforcing members 41 are in a range of 1.5 to 2.0 and preferably equal to 1.6 times the tensile strength of reinforcing members 42 of the second belt 15 and the third belt 16 respectively. For this alternate embodiment, reinforcing members 41 are spaced apart a substantially equal first distance P1 which is much greater than either the second distance P2 or the third distance P3 of second belt 15 and third belt 16 respectively.

Another alternate embodiment of the invention includes the use of polyamide monofilament or polymeric multifilament cords or fibers for the material used to make the reinforcing members 41, 42 and 43. The preferred same range of belt angles A1, A2 and A3 and strengths per unit width T1, T2 and T3 relationships apply as disclosed herein above. Spacing of the reinforcing members for this embodiment may be changed from the preferred range of values to accomplish the preferred strength per unit width T1, T2, T3 relationships at the preferred range of belt angles A1, A2, A3.

The result of a tire 11 according to the present invention is less total mass, reduced tread thickness, improved cornering stiffness, improved belt package triangulation due to less change of belt angles at contact which yields a stable contact patch on contact with the ground surface. As a result of these structure improvements the preferred embodiment tire 11 can further utilize rubber compounds having improved hysteretic properties that may further reduce rolling resistance an additional amount while maintaining acceptable wet and dry traction performance and tread life.

Test Results

Tests were conducted on a number of two-belt industry standard (prior art) tires 1 of different sizes and design loads. Experimental results of these tests are shown below in comparison with the preferred embodiment tire 11 of the present invention.

The tire 11 embodying the present invention has significant advantages in performance when compared with the prior art tire 1 (FIG. 1). The cornering response of the preferred embodiment tire 11 is greatly improved due to the overall belt package 18 rigidity improvements resulting from triangulation of the respective reinforcing members in the three belts. Slip angles of 30 to 40 percent less were obtained for the preferred embodiment tire 11 compared to the prior art tire 1 for the same cornering maneuver. Tests have verified that when the tire 11 contacts the ground surface it remains in contact with the ground with relatively less scrubbing. The pantographic or Poisson effect at the ground contact area due to belt reinforcing member triangulation at the contact patch was much less with tire 11 of this invention in a direct test comparison with the prior art two steel belt package tire 1 having 18 to 28 degree opposed belt reinforcing member angles.

A further advantage of the three steel belt tire 11 is the total belt package 18 strength per unit width (T1+T2+T3) in a circumferential direction. This total three-belt strength per unit width is greater than the prior art tire 1 total two-belt strength per unit width. This added circumferential strength results in lower magnitude stress-strain cycles, therefore, less energy loss per revolution of the tire. Tests have shown an increase in belt strength per unit width in a range of about 12 to 14 percent for tire 11. Results of the United States Department of Transportation Standard $\pi$109 "Braking Energy Test" also yielded a larger than required force to puncture the tire 11 with a standard steel plunger.

Improvements in rolling resistance were obtained for a series of tests on a standard 76 inch diameter roadwheel or drum. A number of prior art base all-season two-belt tires 1 of different size, each known to have a relatively low rolling resistance, were tested to obtain their average rolling resistance. The tests were performed on a roadwheel at various normal loads from 850 to 1650 pounds. The same roadwheel tests were used to obtain the rolling resistance of a number of tires 11 embodying the present invention using the same normal loads. The average rolling resistance values for each load of the preferred embodiment tire 11 were consistantly 15 to 27 percent lower than those for the industry standard prior art base all-season two-belt tire of comparable size and inflation pressure.

Performance improvements were also verified in a direct comparison between a P185/70R14 size tire 11 according to the preferred embodiment (FIG. 2) having a three belt groove depth G2 of 6.1 millimeters and a P185/70R14 tire 1 of the two-belt prior art design (FIG. 1) having a groove depth G1 of 7.8 millimeters. The same mold shell, except for groove depth differences, was used to manufacture both tires. The present invention tire 11 yielded superior performance over the prior art tire 1. In particular, the following tire performance characteristics were significant:

a. Drum rolling resistance by 15 percent lower b. Twin roll rolling resistance by 7 percent lower c. Medium severity wear by 17 percent lower d. Low speed wet traction by 20 percent higher e. Peak dry traction by 9 percent higher f. Sliding dry traction by 10 percent higher Other tire improvements were essential as follows:

g. Tire mass (1%) less h. High speed wet traction approximately equal i. Snow traction approximately equal Extensive experimentation and testing resulted in an optimum combination of tire parameters. The objective of the present invention to reduce rolling resistance was achieved. This is accomplished without a reduction in the tire treadlife or traction performance and without an increase in tire mass.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. A radial ply tire comprising:
   a pair of axially spaced apart beads;
   a carcass having at least one carcass ply and having respective axial end portions of a carcass ply secured to said beads;
   a tread portion located radially outward of said carcass for engagement with a ground surface having a first thickness being the sum of a subtread thickness and a groove depth; and a belt package located between said carcass and said tread portion having three individual belts to form a three-belt construction having a belt thickness, said belt package further including:
  a) the first belt located radially outward of said carcass ply with a plurality of parallel extending reinforcing members and with a first strength per unit width in a circumferential direction, each of said reinforcing members being disposed at a first angle relative to a midcircumferential plane of the tire in a range of 55 degrees to 80 degrees;
  b) the second belt located radially outward of said first belt with a plurality of parallel extending reinforcing members and with a second strength per unit width in the circumferential direction being greater than said first strength, each of said reinforcing members being disposed at a second angle relative to the midcircumferential plane of the tire in a range of 18 degrees to 28 degrees; and
  c) the third belt located radially outward of said second belt with a plurality of parallel extending reinforcing members and with a third strength per unit width in the circumferential direction being greater than either said first or said second strengths, each of said reinforcing members being disposed at a third angle relative to the midcircumferential plane of the tire in a direction opposite to the direction of the second angle in the range of 18 degrees to 28 degrees;

said three-belt construction being characterized by a predetermined strength per unit width in a circumferential direction between each respective belt, said strength per unit width of each belt being directly proportional to the tensile strength of a respective reinforcing member and the square of the cosine of a respective angle between a longitudinal extent of the reinforcing member and a midcircumferential plane and inversely proportional to a respective spacing of said reinforcing member measured perpendicular to the longitudinal extent of the reinforcing members and a ratio of said belt thickness to said groove depth being a value of about 0.32.

2. A radial ply tire comprising:

a pair of axially spaced apart beads;

a carcass having at least one carcass ply and having respective axial end portions of a carcass ply secured to said beads;

a tread portion located radially outward of said carcass for engagement with a ground surface; and a belt package located between said carcass and said tread portion having three individual belts to form a three-belt construction, said belt package further including:

a) the first belt located radially outward of said carcass ply with a first strength per unit width in a circumferential direction and with a plurality of parallel extending reinforcing members being disposed at a first angle relative to a midcircumferential plane of the tire in a range of 55 degrees to 80 degrees and having a first tensile strength;
  b) the second belt located radially outward of said first belt with a second strength per unit width in the circumferential direction being greater than said first strength and with a plurality of parallel extending reinforcing members being disposed at a second angle relative to the midcircumferential plane of the tire in a range of 18 degrees to 28 degrees and having a second tensile strength;
  c) the third belt located radially outward of said second belt with a third strength per unit width in the circumferential direction being greater than either said first or said second strengths and with a plurality of parallel extending reinforcing members being disposed at a third angle relative to the midcircumferential plane of the tire in a direction opposite to the direction of the second angle in the range of 18 degrees to 28 degrees and having said second tensile strength, wherein said first tensile strength is at least equal to said second tensile strength; and said first belt having the plurality of reinforcing members spaced apart a substantially equal first distance, said second belt having the plurality of reinforcing members spaced apart a substantially equal second distance less than the first distance and said third belt having the plurality of reinforcing members spaced apart a substantially equal third distance less than the second distance, said first and second distances being in a range of 1.0 millimeters to 2.9 millimeters and said third distance being in a range of 0.6 millimeters to 1.8 millimeters;

said three-belt construction being characterized by a predetermined strength per unit width in a circumferential direction between each respective belt, said strength per unit width of each belt being directly proportional to the tensile strength of a respective reinforcing member and the square of the cosine of a respective angle between a longitudinal extent of the reinforcing member and a midcircumferential plane and inversely proportional to a respective spacing of said reinforcing member measured perpendicular to the longitudinal extent of the reinforcing members.

* * * * *